Patented June 22, 1954

2,681,902

UNITED STATES PATENT OFFICE 2,681,902

MOLDING COMPOSITIONS OF UNFILLED POLYMETHYLENEDIUREA - FORMALDEHYDE RESIN

Frank B. Rosenberger, Toledo, Ohio, assignor, by mesne assignments, to Allied Chemical & Dye Corporation, New York, N. Y., a corporation of New York No Drawing. Application September 23, 1950, Serial No. 186,489

8 Claims. (Cl. 260—69)

The invention relates to the production of stable transparent molded articles of great toughness.

Urea-formaldehyde reaction products are used commercially in large quantities for the production of molding compositions. Articles molded from urea-formaldehyde molding compositions are well known for their infusibility, and for their freedom from inherent color. The freedom from inherent color that is possessed by urea-formaldehyde reaction products is important because it makes it possible to produce molded articles that are white or of any desired pastel shade. Moreover, articles produced from urea-formaldehyde molding compositions are valuable because they are not discolored by exposure to light.

Urea - formaldehyde molding compositions, however, are subject to one serious limitation. That limitation is the fact that stable molded articles cannot be produced from a urea-formaldehyde molding composition unless the composition contains a substantial proportion of a cellulose filler. It has been well established that an article made from a urea-formaldehyde composition containing no cellulose filler is unstable in that it rapidly cracks and disintegrates. Thus, it has never been possible to produce a stable transparent article from a urea-formaldehyde reaction product.

The principal object of the invention is the production of stable transparent molded articles of great toughness. More specific objects and advantages are apparent from the description, which discloses and illustrates but is not intended to limit the scope of the invention.

United States Patent No. 2,400,016 describes the state of the art with respect to reaction products of formaldehyde with an aliphatic diurea as follows: "Resins prepared by the reaction of formaldehyde with an aliphatic diurea have been found to be unsuitable for ordinary commercial use, because they have very poor water resistance. Articles molded from such resins suffer severe swelling, softening and splitting when left in contact with cold water for one day, and undergo marked swelling even upon exposure to a moist atmosphere. The addition of a urea-formaldehyde reaction product to an aliphatic diurea-formaldehyde reaction product does not produce a material improvement in the water resistance of articles molded from the composition."

The foregoing statements are correct as applied to the more common diureas such as ethylene diurea. The present invention, however, is based upon the discovery that diureas of a certain specific class are an exception to the general rule stated in the foregoing quotation, in that molded articles produced from a reaction product of formaldehyde with a diurea of that specific class have water resistance that is remarkably superior to the water resistance of articles produced from a reaction product of formaldehyde with one of the more common diureas, and upon the further discovery that it is possible to produce, from a dehydrated reaction product of formaldehyde with a diurea of that specific class, molded articles that are transparent and contain no filler and yet are perfectly stable and have great toughness. The present invention fills the need that has existed for many years for stable transparent articles of the urea-formaldehyde type—a need that has existed because of the necessity of using a substantial proportion of a cellulose filler in order to produce stable molded articles from urea-formaldehyde reaction products.

Molded articles embodying the invention are unique in that they are transparent and yet are stable and have great toughness. The molded articles of the invention comprise a resinous dehydrated unsubstituted reaction product of formaldehyde with a polymethylene diurea having from four to ten methylene groups.

The dehydrated reaction product that is used in the production of molded articles embodying the invention is an unsubstituted reaction product. Alkoxy-substituted reaction products of formaldehyde with urea or a diurea have been produced by reaction of an alcohol and formaldehyde with urea or a diurea, and such alcohol-modification of the reaction products renders them soluble in the organic solvents used in the production of coating compositions. However, such alkoxy-substituted reaction products are not satisfactory for the production of molded articles because they cannot be cured in a closed mold, but can be cured only by baking in a thin film exposed to the atmosphere. Baking in a thin film has been found to be necessary in order to cause the alcohol to split out, and splitting out of the alcohol has been found to be necessary to permit curing of the alkoxy-substituted reaction products.

The articles embodying the invention, which are transparent and yet are stable and have great toughness, are distinguished by the fact that they are produced by the application of heat and pressure. They are distinguished also by the fact that they are tangible articles of substantial thickness as compared to mere films. The thickness of the unfilled articles embodying the invention is such that if the articles were made from a urea-formaldehyde reaction product instead of from a reaction product of formaldehyde with a diurea of the specific class hereinbefore described, the articles would gradually disintegrate upon standing at ordinary temperatures.

The nearest approach to the stable transparent molded articles of the present invention that has been known heretofore is an unfilled product produced from a melamine-formaldehyde molding composition that has been available commercially but has not gone into extensive use. The outstanding superiority of the stable transparent molded articles of the present invention, over the closest approach to such articles that has been made heretofore, has been demonstrated as follows:

A thermosetting molding composition capable of producing stable transparent molded articles embodying the invention was prepared by the following procedure: Hexamethylene diurea (202 grams), formalin (162 grams of 37 per cent commercial aqueous formaldehyde) and water (324 grams) were refluxed at a temperature of about 100° C. for about thirty minutes. The initial pH of the reaction mixture was adjusted to approximately 7.5 by the addition of triethanolamine (about 2 cc. of a solution consisting of 50 per cent triethanolamine and 50 per cent water). (The terms "per cent" and "parts" as used herein refer to per cent and parts by weight unless otherwise specified.) After the refluxing was completed, the solution was allowed to cool slightly to a temperature between 90 and 95° C., and lactic acid (from 10 to 15 cc. of a solution consisting of 10 per cent lactic acid and 90 per cent water) was added to lower the pH of the reaction mixture to approximately 5.0, causing rapid gelation of the hot hexamethylene diurea-formaldehyde resin solution. The hot gelled mass was immediately forced through a screen of ⅛ to ¼ square inch mesh size, and the free water was quickly removed from the product by baking the finely divided particles in an oven at a temperature of about 150° F. for about fifteen to thirty minutes. The dehydrated resinous reaction product was then ground in a ball mill for about one-half hour, and samples of the unfilled molding compound so obtained, A in Table 1, were molded under heat and pressure to produce stable transparent molded articles of great toughness which were used for physical testing.

For the sake of comparison, samples of an unfilled melamine-formaldehyde molding compound (available commercially as Melmac 404) B in Table 1, were also molded under heat and pressure. The articles molded from the unfilled molding compound of the present invention and the similar articles molded from the heretofore known unfilled melamine-formaldehyde molding compound were subjected to the following tests:

(a) In a test showing the superior toughness and flexibility of the articles of the invention while hot, threaded bottle caps, having a diameter of ⅞ inch and having eight threads per inch with 1/16 inch difference between the major and minor diameters, were molded for two to four minutes under a pressure of one to four tons per square inch of projected area at a temperature of about 290° F., and the caps were stripped from the mold while still hot, with the results shown in Table 1(a). The test was repeated with six sets of bottle caps molded from compounds A and B, and in each case the cap molded from the compound of the invention was superior.

(b) The unusual toughness and flexibility of articles embodying the invention while hot is also evident from their outstanding resistance to cracking and crazing when subjected to changes in temperature and humidity. Two-inch diameter disks having a thickness of 1/15 inch, molded from compounds A and B for one to four minutes under a pressure of one to four tons per square inch of projected area at a temperature of about 305° F., were immersed in boiling water for one hour and then baked in an oven at a temperature of about 185° F. for one hour with the results shown in Table 1(b). The test was repeated with eight sets of disks and in each case the disk molded from the compound of the invention was superior.

(c) In another test of articles molded from compounds A and B, disks which had been subjected to the conditions described in the preceding paragraph were allowed to cool to room temperature and dropped onto concrete from a height of about four feet with the results shown in Table 1(c). All of the disks from the test described in paragraph (b) were dropped and in each instance the disk molded from compound A was superior.

In Table 1, in addition to the results of the tests described in paragraphs (a), (b) and (c), the impact strength (foot-pounds), (d) in Table 1 is given for articles molded from compounds A and B. Small disks, prepared as described in paragraph (b), were tested for impact strength by a "Charpy" type test, using test equipment (Schopper) which was essentially the same as the standard "Charpy" test apparatus by means of which an arbitrary gauge reading is obtained which represents the impact strength as the energy (foot-pounds) absorbed in breaking a molded article.

The most significant evidence of the toughness and flexibility of articles embodying the invention is given in Table 1, (e) and (f), as the results of standard tests showing the modulus of elasticity and the flexural strength of the articles molded from compounds A and B, determined from the deflection of the molded articles while pressure is applied.

Table 1

| | A | B |
|---|---|---|
| (a) Six samples | All uncracked | All cracked or broken. |
| (b) Eight samples | ____do____ | All badly cracked. |
| (c) Eight samples | All uncracked and unbroken. | All broken into two or more pieces. |
| (d) Impact strength | .27 ft. lbs | .20 ft. lbs. |
| (e) Modulus of elasticity. | 655,000 p. s. i | 1,060,000 p. s. i. |
| (f) Flexural strength | 11,000 p. s. i | 8,000 p. s. i. |

As the results in Table 1 indicate, the articles molded from compound A, an unfilled polymethylene diureaformaldehyde composition embodying the invention, are remarkably superior to the articles molded from compound B, an unfilled melamine-formaldehyde molding composition which produces molded articles which are the nearest approach to the stable transparent articles of the invention. The unusual toughness of the molded articles of the invention is apparent not only from the results of the general tests (a, b and c) which demonstrate flexibility and resistance to cracking, but also from the specific physical properties (d, e and f). The relatively low modulus of elasticity of an article molded from an unfilled polymethylene diurea-formaldehyde composition indicates the extreme flexibility of molded articles of the invention. Moreover in addition to their flexibility, such articles have high impact strength and high flexural strength.

The superiority of the stable transparent molded articles of the invention over articles molded from heretofore known cellulose-filled urea-formaldehyde compositions is also significant. The stability as well as the toughness and flexibility of articles molded from any polymethylene diurea-formaldehyde composition of the invention is especially evident in the superior resistance of such molded articles to cracking and crazing when subjected to severe changes in humidity and temperature. (The term "polymethylene diurea" is used herein to mean a polymethylene diurea of the specific class having from four to ten methylene groups.) For example, in each cycle of a test involving changes in the temperature and humidity, cosmetic jar lids are filled with boiling water, allowed to stand about ten minutes, emptied, dried and then baked at a temperature of about 120° F. for twenty-four hours. A cosmetic jar lid three inches in diameter, molded at a temperature of about 305° F. for three minutes from a commercial urea-formaldehyde composition, when subjected to several cycles of such a test, is cracked after six cycles of the test, while a jar lid molded by the same procedure from any polymethylene diurea formaldehyde composition embodying the invention remains uncracked even after fifteen cycles of the same test.

The molded articles embodying the invention are substantially transparent as well as being perfectly stable and having great toughness as hereinbefore demonstrated. The transparency of molded articles produced from a polymethylene diurea-formaldehyde composition is easily distinguished from the mere translucency of articles molded from any urea-formaldehyde composition heretofore known. For example, the transparency of an article of the invention is such that if a disk having a thickness of about $\frac{1}{15}$ of an inch is held against a typewritten page, the type can be read through the disk. However, if a disk of the same thickness, produced from a cellulose-filled urea-formaldehyde molding compound which has the highest translucency obtainable from such a compound, is held over the same type, the lines of type are barely distinguishable and the words cannot be identified.

The transparency of molded articles of the invention is essentially the same as the transparency of articles produced from the commercially available unfilled melamine-formaldehyde molding composition hereinbefore described. It is possible to distinguish colors through a molded article embodying the invention, and such an article has only a slight haze which does not interfere with its use in many practical applications (e. g., as a lens in an automobile dome light). If a colored article is desired, dyes that tint without affecting the transparency may be incorporated in a polymethylene diurea-formaldehyde molding composition.

The stable transparent molded articles embodying the invention comprise a resinous dehydrated unsubstituted reaction product of formaldehyde with a polymethylene diurea having from four to ten methylene groups. Such diureas include tetramethylene diurea, pentamethylene diurea, hexamethylene diurea, heptamethylene diurea, octamethylene diurea, nonamethylene diurea and decamethylene diurea.

In the production of molded articles embodying the invention the use of a polymethylene diurea having five, six or seven methylene groups is preferred since compounds prepared from such diureas give the best combination of desirable physical properties, particularly high water resistance of the molded articles and ease of handling of the resin solution, in addition to the stability, transparency and toughness hereinbefore discussed. Moreover, hexamethylene diurea is preferred for economic reasons because it is the most readily available of the diureas that may be used in the preparation of the resinous reaction products which produce stable transparent molded articles of great toughness.

The polymethylene diureas used in the preparation of molded articles embodying the invention may be reacted either with formaldehyde or with a polymer thereof, such as paraformaldehyde. When used for this reaction paraformaldehyde is considered to split up so that the substance actually taking part in the reaction is formaldehyde. Any of the known procedures may be employed in the preparation of the resinous dehydrated unsubstituted reaction products used in molded articles of the invention. For example, the polymethylene diurea may be reacted with an aqueous solution of formaldehyde or it may be mixed with paraformaldehyde and processed on a heated two-roll (differential speed) rubber mill.

In general, a resin solution for use in the production of stable transparent molded articles embodying the invention may be prepared by the reaction of a polymethylene diurea having from four to ten methylene groups with ordinary commercial aqueous formaldehyde. Free water is usually added to the reaction mixture to avoid a paste-like consistency, and the initial pH of the solution is adjusted by the addition of any desired base such as sodium hydroxide, barium hydroxide or triethanolamine. The solution is refluxed at a temperature of approximately 100° C. for a period of time ranging from about ten to about one hundred minutes, depending upon the degree of reaction desired. After refluxing about ten minutes, the resin solution is clear and has a water-like viscosity, however, as the reflux time is increased, the resin solution becomes progressively more cloudy and viscous, especially after it is allowed to cool slightly. A solution comprising formaldehyde and a lower member of the polymethylene diurea series may require a longer reflux time than one comprising a diurea containing a greater number of methylene groups, in order to produce a resinous reaction product which has the most desirable physical properties. After the refluxing is completed, the reaction product is allowed to cool slightly to approximately 90° C. to 95° C., and the pH of the reaction product is lowered by the addition of acid (such as a solution consisting of 10 per cent lactic acid and 90 per cent water) if such an adjustment is necessary to insure satisfactory curability of the resin (as hereinafter discussed).

In the preparation of a polymethylene diurea-formaldehyde resin solution by the procedure described in the preceding paragraph, the molar ratio of formaldehyde to the polymethylene diurea varies when different diureas are employed. In general, however, the optimum results may be obtained when the molar ratio of the reactants is approximately one and one-half mols of formaldehyde for each mol of the polymethylene diurea although as little as one mol of formaldehyde may be used.

Since the molecular weights of the polymethylene diureas increase with the number of methylene groups, the proportion of liquid in a polymethylene diurea-formaldehyde reaction mixture is low when a higher member of the polymethylene diurea series is employed and it is difficult to obtain a satisfactory solution without using an increased amount of formaldehyde. For this reason it is often desirable to use a higher molar ratio of formaldehyde to the polymethylene diurea in the preparation of a diurea-formaldehyde resin solution for use in producing stable transparent molded articles embodying the invention. For example, in the preparation of a decamethylene diurea-formaldehyde resin solution a molar ratio of four mols of formaldehyde for each mol of decamethylene diurea may be employed. Moreover, it is usually desirable to add free water to the reaction mixture in order to facilitate the complete solution of the diurea.

The initial pH of reaction mixture comprising a polymethylene diurea and commercial aqueous formaldehyde may be adjusted by the addition of a base such as triethanolamine (preferably a solution consisting of 50 per cent triethanolamine and 50 per cent water). The initial pH of a reaction mixture comprising a polymethylene diurea and commercial aqueous formaldehyde, in the preparation of a resinous reaction product for use in molded articles of the invention, may range from approximately 7.5 to approximately 8.5. During the reaction, however, the pH of the mixture tends to drop considerably, and the initial pH should be such that the pH of the solution during the reaction ranges from about 6.5 to about 8.0, since a lower pH might cause gelation of the resin solution. In the production of molded articles of the invention it is preferred that the pH of the resin solution during most of the reaction range from approximately 6.8 to approximately 7.0. Such a pH may be obtained by employing an initial pH ranging from about 7.6 to about 7.8. After the refluxing of the resin solution is completed, that is when the condensation has reached the point of incipient gelation, the pH of the reaction product may be lowered by the addition of a dilute lactic acid solution to obtain a pH within the range from about 5.5 to about 7.0, and it is preferred that the pH of the resin solution be about 6.5 so that the resin may be cured readily to produce molded articles of the invention.

Alternatively, instead of lowering the pH of the resin solution with lactic acid, as described in the preceding paragraph, any other acid-reacting catalyst may be used in hardening or converting the resinous reaction product into an infusible resin in the production of molded articles of the invention. Since the action of such a catalyst is due solely to its acidity, any acid substance, such as an inorganic acid, an organic acid or an acid salt such as ammonium chloride or sulfate, may be used as the catalyst. The degree of acidity employed during the hardening of the resinous reaction product is simply that acidity which causes the resinous reaction product to harden at the desired rate. Since polymethylene diurea formaldehyde compositions possess a very excellent speed of cure, all such acid-reacting catalysts are used in very small proportions (i. e., from about 0.05 to about 0.5 per cent of the composition), which are much lower than the usual catalytic amounts.

When different diureas are reacted with formaldehyde by the procedure hereinbefore described, the physical properties of the resin solutions may vary. For example, when hexamethylene diurea is employed, a sample of the resin solution taken about ten minutes after the reflux temperature is reached is clear and has a water-like viscosity at the reflux temperature (i. e., about 100° C.), but as the resinous reaction product cools, it becomes increasingly cloudy and viscous, characterized by a creamy consistency having a soapy feel, and at room temperature the resinous product is an opaque, soft, semi-solid material. However, if tetramethylene diurea is employed, a sample of the clear resin solution taken about ten minutes after the reflux temperature is reached and allowed to cool to room temperature is a cloudy, fairly viscous solution which remains pourable for at least one or two days.

An unsubstituted polymethylene diurea-formaldehyde resinous reaction product may be dehydrated to form an unfilled molding compound which produces stable transparent molded articles of great toughness. The free water must be removed from the resinous reaction product since the presence of water in the molding compound imparts serious defects to the molded articles and prevents the satisfactory curing of the resin.

The resinous unsubstituted polymethylene diurea-formaldehyde reaction product obtained by the procedure hereinbefore described may be dried in any suitable manner and then ground in a ball mill to produce a dehydrated molding composition for use in the preparation of stable transparent molded articles. The methods which may be employed to dry the resin solution include spray drying, drum drying, vacuum drum drying, vacuum still drying and pan drying. A dry molding compound may also be obtained by partially dehydrating the resin solution by distillation of the liquid and then subsequently subjecting the resin to pan drying.

Still another method of producing an unfilled molding compound of the invention from the resinous reaction product consists in dehydrating the resin solutions according to the following procedure: After the refluxing of the reaction mixture is completed and the resin solution is cooled slightly to approximately 90° C. to 95° C., the pH of the solution is adjusted to about 5.0 by the addition of a solution consisting of 10 per cent lactic acid and 90 per cent water. This low pH causes rapid gelation of the hot resin solution, and the hot gelled mass is immediately forced through a screen of ⅛ to ¼ square inch mesh size. This finely divides the gelled material and as the particles cool, the autocatalytic condensation is arrested. By virtue of the cellular, sponge-like structure of the gelled resin particles, the free water may then be very quickly removed by baking the particles at a temperature of approximately 150° F. for about fifteen to thirty minutes.

The procedure described in the preceding paragraph when used in the laboratory is capable of producing resinous dehydrated unsubstituted reaction products which may be employed in the preparation of stable transparent molded articles embodying the invention. However, the process requires very close control of the reaction conditions in order to produce the desired results.

If desired, when an unsubstituted resinous reaction product obtained by the procedure hereinbefore described is very viscous, a polymethylene diurea-formaldehyde molding compound for use in stable transparent molded articles embodying the invention may be prepared by dehydration of the resin by milling the viscous product on a heated two-roll (differential speed) rubber mill.

The method of preparing a dehydrated molding compound from an unsubstituted reaction product of formaldehyde with a polymethylene diurea may vary when different diureas are employed. For example, it may be desirable to dehydrate a resin solution prepared from one of the lower members of the specific class of diureas hereinbefore described (e. g., tetramethylene diurea) by spray drying or vacuum drum drying. However, a resinous solution prepared from a diurea containing a greater number of methylene groups (e. g., decamethylene diurea) may more conveniently be milled on a heated two-roll (differential speed) rubber mill to obtain a resinous dehydrated unsubstituted reaction product which may be molded to produce stable transparent articles embodying the invention.

In some cases it may be convenient to prepare a resinous dehydrated unsubstituted reaction product for use in the production of stable transparent molded articles by the reaction of anhydrous paraformaldehyde with an anhydrous polymethylene diurea. For example, a polymethylene diurea and paraformaldehyde may be milled on a heated two-roll (differential speed) rubber mill at a temperature of approximately 200° F. for about five to about twenty minutes to obtain a molding compound which is capable of producing water clear, extremely flexible molded articles. However, such molded articles are inferior in their heat and water resistance to articles produced from a polymethylene diurea-formaldehyde resin solution.

In the production of molded articles embodying the invention plasticizers, lubricants, catalysts, dyes and other coloring matter which function without affecting the transparency of the final product may be incorporated in a resinous dehydrated unsubstituted reaction product to produce a suitable molding composition. The amount used in the case of each of the foregoing ingredients is the usual amount consistent with the particular function of each in the molding composition.

The molded articles embodying the invention prepared from the various polymethylene diurea-formaldehyde reaction products may have slightly different physical properties: e. g., a tetramethylene diurea-formaldehyde resin produces unusually hard molded articles, while resins made from diureas containing a higher number of methylene groups, such as a decamethylene diurea-formaldehyde resin, produce extremely tough molded articles. The molded articles comprising a resinous reaction product of formaldehyde with one of the higher members of the polymethylene diurea series exhibit certain physical properties that are typical of many thermoplastic articles being characterized by rather soft, rubbery natures with low moduli of elasticity and low compressive strengths. Although such molded articles are not suitable for the usual range of applications of urea-formaldehyde and melamine-formaldehyde articles, they may be employed for other purposes such as the applications of the thermoplastics which they resemble.

Since the unsubstituted resinous reaction products of formaldehyde with polymethylene diureas are completely compatible with other resins such as urea-formaldehyde or melamine-formaldehyde resins if desired molding compounds embodying the invention may be produced by incorporating a urea-formaldehyde or melamine-formaldehyde resin in a polymethylene diurea-formaldehyde resinous reaction product. For example, a modified polymethylene diurea-formaldehyde composition may be prepared by mixing a polymethylene diurea-formaldehyde resin solution with a commercial urea-formaldehyde or melamine-formaldehyde resin solution. Certain physical properties (e. g., flexibility) of articles molded from such modified polymethylene diurea-formaldehyde compositions indicate that the properties of melamine-formaldehyde and polymethylene diurea-formaldehyde compositions complement each other better than the properties of urea-formaldehyde and polymethylene diurea-formaldehyde compositions.

The proportion of the polymethylene diurea-formaldehyde resin in a molding composition embodying the invention may range from 100 per cent of the resin content down to the minimum proportion which imparts a substantial improvement in the properties of articles molded from the composition over the properties of articles molded from ordinary urea-formaldehyde or melamine-formaldehyde molding compositions (i. e., about 30 per cent of the resin content). However, the improvements in the properties of articles molded from compositions embodying the invention are directly proportional to the amount of polymethylene diurea-formaldehyde resin used and, therefore, in the production of molded articles embodying the invention it is preferred that the entire resin content consist of a polymethylene diurea-formaldehyde reaction product. If desired, a urea-formaldehyde or melamine-formaldehyde resin may be incorporated in a molding composition embodying the invention in order to reduce the cost, but if more than 30 per cent of the resin content consists of a urea-formaldehyde or melamine-formaldehyde resin, there is a deleterious effect upon the properties of articles molded from the composition, and the properties of such articles tend to approach the properties of articles produced from ordinary urea-formaldehyde and melamine-formaldehyde resins.

The resinous dehydrated unsubstituted reaction products of formaldehyde with polymethylene diureas which are employed in the production of stable transparent molded articles of the invention are characterized by their great moldability. In general, the resinous reaction products may be converted to infusible resins in the production of articles embodying the invention by molding at a temperature ranging from about 260° F. to about 325° F. (preferably at about 300° F.) for about one to four minutes under a pressure of one to four tons per square inch of projected area. The polymethylene diurea-formaldehyde molding compounds are capable of being molded in a great variety of molds; they possess a rapid curing rate; and the rubbery flexibility of such compounds (especially at elevated temperatures) permits easy removal of the articles from the molds. Thus if there are undercuts in a molded article produced from a thermosetting molding composition embodying the invention, the article may be readily removed from the mold without cracking. Moreover, internally threaded bottle caps do not need to be unscrewed from the mold but can be stripped off while hot without cracking, as hereinbefore demonstrated.

The water resistance of articles embodying the invention is highly superior to the water resistance of articles produced from a molding compound prepared from a reaction product of formaldehyde with a more common diurea. The extremely poor water resistance of molded articles produced from the more common diureas (e. g., ethylene diurea) is significantly manifest not only from the high water absorption but also from the marked tendency of such molded articles to split when immersed in cold water as hereinbefore discussed. (Water resistance varies with the amount of moisture that an article is capable of absorbing, because the degree of deterioration upon exposure to moisture varies with the amount of water absorbed.) Molded articles embodying the invention do not have such high water absorption and do not exhibit such a tendency to split. Moreover, the water resistance of the molded articles of the invention increases as the number of methylene groups in the diurea which is used in the preparation of the molding compounds is increased. In general, articles embodying the invention produced from a resinous dehydrated unsubstituted reaction product of formaldehyde with a polymethylene diurea having from four to ten methylene groups have water resistance that is substantially the same or higher than the water resistance of articles produced from the cellulose-filled urea-formaldehyde molding compounds that have obtained wide commercial acceptance.

The following examples illustrate the practice of the invention:

Example 1

A thermosetting molding composition capable of producing stable transparent molded articles is prepared as follows: A polymethylene-diurea-formaldehyde resin solution is prepared according to the procedure hereinbefore described by refluxing a solution comprising tetramethylene diurea (174 grams), formalin (162 grams of 37 per cent commercial aqueous formaldehyde) and water (162 grams) at a temperature of approximately 100° C. for about thirty minutes. The initial pH of the reaction mixture is adjusted within the range hereinbefore described (i. e., from about 7.5 to about 8.5) by the addition of a sufficient amount of triethanolamine (a solution consisting of 50 per cent triethanolamine and 50 per cent water). After the refluxing is completed, the solution is allowed to cool slightly to a temperature from about 90° C. to about 95° C., and lactic acid (a solution consisting of 10 per cent lactic acid and 90 per cent water) is added in the amount that is required to lower the pH of the solution to a value within the range hereinbefore described (i. e., from about 7.0 to about 5.5). The resinous unsubstituted reaction product is dehydrated by one of the procedures hereinbefore described, and the unfilled molding composition so obtained is molded under heat and pressure to produce stable transparent articles of great toughness.

Example 2

A thermosetting molding composition embodying the invention is prepared by a procedure which is the same as that described in Example 1 except that the reflux mixture comprises hexamethylene diurea (202 grams), formalin (121.5 grams of 37 per cent commercial aqueous formaldehyde) and water (243 grams). The unfilled molding compound so obtained is molded under heat and pressure to produce stable transparent molded articles of great toughness.

Example 3

A thermosetting molding composition embodying the invention is prepared by a procedure which is the same as that described in Example 1 except that the reflux mixture comprises heptamethylene diurea (216 grams), formalin (162 grams of 37 per cent commercial aqueous formaldehyde) and water (324 grams). The unfilled molding compound so obtained is molded under heat and pressure to produce stable transparent molded articles of great toughness.

Example 4

A thermosetting molding composition embodying the invention is prepared by a procedure which is the same as that described in Example 1 except that the reflux mixture comprises decamethylene diurea (244 grams), formalin (258 grams of 37 per cent commercial aqueous formaldehyde) and water (324 grams). The unfilled molding compound so obtained is molded under heat and pressure to produce stable transparent molded articles of great toughness.

Having described the invention, I claim:

1. A dry, thermosetting unfilled molding composition which produces stable transparent molded articles of great toughness when cured by the application of heat and pressure, the resinous component of which consists of a finely-divided, dehydrated, gelled, unsubstituted reaction product of from one to four mols of formaldehyde for every one mol of a polymethylene diurea having from four to ten methylene groups, said gelled reaction product being produced by refluxing an aqueous solution containing from one to four mols of formaldehyde per mol of said diurea at a temperature of about 100° C. and an initial pH between 7.5 and 8.5 to the point of incipient gelation and then cooling and adjusting the pH to from 5.0 to 6.5 to cause rapid gelation.

2. A dry, thermosetting unfilled molding composition which produces stable transparent molded articles of great toughness when cured by the application of heat and pressure, the resinous component of which consists of a finely-divided, dehydrated, gelled, unsubstituted reaction product of from one to four mols of formaldehyde for every one mol of a polymethylene diurea having from five to seven methylene groups, said gelled reaction product being produced by refluxing an aqueous solution containing from one to four mols of formaldehyde per mol of said diurea at a temperature of about 100° C. and an initial pH between 7.5 and 8.5 to the point of incipient gelation and then cooling and adjusting the pH to from 5.0 to 6.5 to cause rapid gelation.

3. A composition as claimed in claim 2 wherein the polymethylene diurea is hexamethylene diurea.

4. A molded article which is produced by the molding under heat and pressure of the composition claimed in claim 3.

5. A composition as claimed in claim 1 wherein the polymethylene diurea is tetramethylene diurea.

6. A composition as claimed in claim 1 wherein the polymethylene diurea is heptamethylene diurea.

7. A composition as claimed in claim 1 wherein the polymethylene diurea is decamethylene diurea.

8. A molded article which is produced by the molding under heat and pressure of the composition of claim 1.

(References on following page)

References Cited in the file of this patent

UNITED STATES PATENTS

| Number | Name | Date |
|---|---|---|
| 2,145,242 | Arnold | Jan. 31, 1939 |
| 2,400,016 | Meyer | May 7, 1946 |
| 2,485,187 | Cadot | Oct. 18, 1949 |
| 2,572,256 | Garner | Oct. 23, 1951 |

FOREIGN PATENTS

| Number | Country | Date |
|---|---|---|
| 591,303 | Great Britain | Aug. 13, 1947 |
| 895,207 | France | Mar. 27, 1944 |